US006403251B1

(12) United States Patent
Baggaley et al.

(10) Patent No.: US 6,403,251 B1
(45) Date of Patent: Jun. 11, 2002

(54) BATTERY PACK WITH MULTIPLE SECURE MODULES

(75) Inventors: David C. Baggaley, Gainesville; Alexander Jacobs, III, Alachua, both of FL (US)

(73) Assignee: Moltech Power Systems, Inc, Gainesville, FL (US)

( * ) Notice: Subject to any disclaimer, the term of this patent is extended or adjusted under 35 U.S.C. 154(b) by 0 days.

(21) Appl. No.: 09/494,990

(22) Filed: Jan. 31, 2000

(51) Int. Cl.$^7$ ................................................ H01M 2/00
(52) U.S. Cl. ........................... 429/61; 429/92; 429/100; 429/99; 429/9; 320/127
(58) Field of Search ................................. 429/149, 150, 429/156, 158, 160, 121, 123, 61, 90, 7, 96, 100, 9, 91, 92, 99; 320/127, 119, 121, 122, 128, 137, 138

(56) References Cited

U.S. PATENT DOCUMENTS

| | | | | |
|---|---|---|---|---|
| 5,565,759 A | * | 10/1996 | Dunstan | ..................... 320/135 |
| 5,652,500 A | | 7/1997 | Kadouchi et al. | |
| 5,734,254 A | * | 3/1998 | Stephens | ..................... 320/106 |
| 5,910,723 A | | 6/1999 | Perelle | |
| 5,945,806 A | * | 8/1999 | Faulk | ........................ 320/327 |

FOREIGN PATENT DOCUMENTS

| | | |
|---|---|---|
| JP | 10-302846 | 11/1998 |
| WO | WO 99/33132 | 7/1999 |

* cited by examiner

Primary Examiner—Stephen Kalafut
Assistant Examiner—R Alejandro
(74) Attorney, Agent, or Firm—Sven W Hanson (57) ABSTRACT

A modularized power supply is presented employing individual electrochemical cells which are rendered inert when separated from a specified unlocking circuit. The cells are enclosed in a cell module having a disabling circuit which isolates the cell terminals and prevents release of significant cell energy. A switch in the disabling circuit is activated when the cell module is connected to the specified unlocking circuit in an external frame. The frame includes receptacles for receiving multiple modules, all of which must be connected before power is delivered to a host interface. The frame may include circuits and devices for monitoring the performance of the modules, for controlling cell charging and discharging, and protective elements to protect the modules and tray from aberrant conditions such as high temperatures, overcurrent, and similar events. By including these in the frame, fewer elements are required in the individual modules, reducing their complexity, weight and cost. The present concepts are embodied in both integrated power supplies and removable battery packs. Using thin rigid modules, a large flat battery pack is formed. The relatively smaller modules are less susceptible to damage from handling. This is particularly advantageous when the cell used in embodiments with a lithium ion, lithium ion polymer or similar cell having a potential for producing fires in the event of an internal short. Power supplies using both primary and secondary cells are provided.

22 Claims, 5 Drawing Sheets

BATTERY PACK WITH MULTIPLE SECURE MODULES

BACKGROUND OF THE INVENTION

The present invention pertains to portable power supplies having removable and replaceable electrochemical cells. In particular, the invention pertains to power supplies employing multiple replaceable primary or secondary cells.

New portable electronic devices, such as laptop computers, need thinner, lighter batteries delivering more power and energy capacity. A thinner shape is needed to fit in the smaller and smaller forms of these electronic devices. Capacity demands require a large total battery volume, with the result being a drive toward large thin battery packs. However, a large thin battery is highly susceptible to damage through twisting, bending or folding. When battery packs are inserted or removed from a powered device or handled by a user, they become exposed to these kinds of actions. This is potentially dangerous as it can cause internal shorting of the cells. Battery packs having aspect ratios in excess of 50:1 (maximum edge-to-edge planar dimension to thickness) are particularly susceptible to damage. The dangers are of particular concern with the cells most desired to be used for thin high capacity battery packs, such as, for example, lithium ion polymer cells. Due to the chemical composition and operating characteristics of these cells, events such as shorting can result in fires. Current lithium ion batteries of any configuration incorporate protective circuit elements physically attached to the individual battery packs to protect against operation during extreme voltage, current or temperature conditions. The need for these additional elements on each pack add to the complexity and cost of the packs. An additional protection method is to provide a key or concealed switch on the battery pack which must be activated to connect the battery pack terminals to the enclosed cell. In this way, inadvertent contact with the terminals by the user will not result in shorting of the cell. Mechanical locks have been used in prior battery packs but are typically too easily circumvented, allowing the user to place themselves at risk.

One part of the solution to the risks in large thin battery packs is to subdivide the battery into smaller modularized packs, each less susceptible to damage. However, the need to include protective devices on the individual packs results in significantly increased cost and weight of the pack. Additional parts also increase the risk to the user in handling.

What is needed is a simple and secure method of modularizing thin cells to form a large thin battery pack.

SUMMARY OF THE INVENTION

The present invention provides a modularized power supply using multiple cell modules that are rendered electrically inert until activated when combined with an external circuit having specific response characteristics. Each cell module is separable from the power supply and includes at least one primary or rechargeable secondary cell. In each module, at least one of each cell's terminals is isolated from the exposed contacts of the cell module when the cell module is separated from the power supply, reducing the opportunity for improper charge or discharge of the cell. The cell terminals are isolated by a disabling circuit packaged with the cell in the cell module. The disabling circuit includes a switch and switch control which are activated when the disabling circuit is connected to an external unlocking circuit having defined characteristics. When activated, the switch connects the cell terminals to the exposed cell module contacts, allowing access to the stored cell energy or for charging functions. The characteristics of the external unlocking circuit are defined by the disabling circuit and must generate a specific response in the disabling circuit which activates the switch control and switch. This event is a result of the unlocking circuit being energized solely by the cell energy. This is because it is presumed that the cell module will be connected with an otherwise unpowered host device. In effect, the cell module remains inert until "self-awakening" when connected to an appropriate (otherwise unpowered) external circuit.

Because a host device most likely requires power of a specific characteristic such as voltage, it is necessary to ensure that the individual cell modules are not connected to the host until a full complement of modules have been successfully connected to provide the characteristic power. An enabling circuit is provided on a frame to which cell modules are physically connected. The enabling circuit includes the unlocking circuits for each connected module and includes logic circuitry which enables the cell modules to be connected to a host only when a full complement of cells are connected. The enabling circuit and disabling circuit may also include devices for passing and receiving identification signals between the frame and the cell modules. The identification signals allow validation of appropriate cell modules prior to enablement with the specific power supply.

The frame may also include a control circuit providing cell protective elements, charging circuits and cell monitoring circuits. Because the individual modules are otherwise rendered inert, a single set of protective devices for all of the cell modules can be provided in the frame. Similarly, cell charging and discharging control circuits and cell monitoring circuits may be included in the control circuit. The number of modules combined in one battery pack is dependent upon the power requirements of the host device to be powered and the capacity of the individual cells. The number of modules may be from two to twenty although the concept of the "self-awakening" cell module is applicable to a single cell power supply.

An additional advantage of multiple modularized cells is increased design flexibility as various combinations of a single module configuration may be joined to satisfy different performance requirements. In various embodiments, the frame may be integral with a host device or is an independent structure such as a tray. When the power supply is integrated into a host device, the enabling circuitry and control circuitry may be alternatively integrated with existing host electronics. An independent tray including modules is configured as a battery pack removable from host device interface contacts and replaceable as a unit. The frame has receptacles such as open-sided pockets or slots for receiving the modules and includes a module interface having contacts associated with each receptacle. Using cell designs that can be configured to form cell modules that are small and thin, but having maximum aspect ratios preferably less than 50:1, flat large capacity power supplies and battery packs with high aspect ratios are formed. The relatively small size and aspect ratio of the modules, as compared to an equivalent single flat cell assembly, results in a more durable unit for user handling. Combined with described cell module's inertness during handling, the modularization of the energy capacity into a multiple of modules provides a uniquely strong and secure replaceable power supply. Other advantages of the present concepts will become clear from the following detailed description and figures.

DESCRIPTION OF THE PREFERRED EMBODIMENTS

Figure 1:
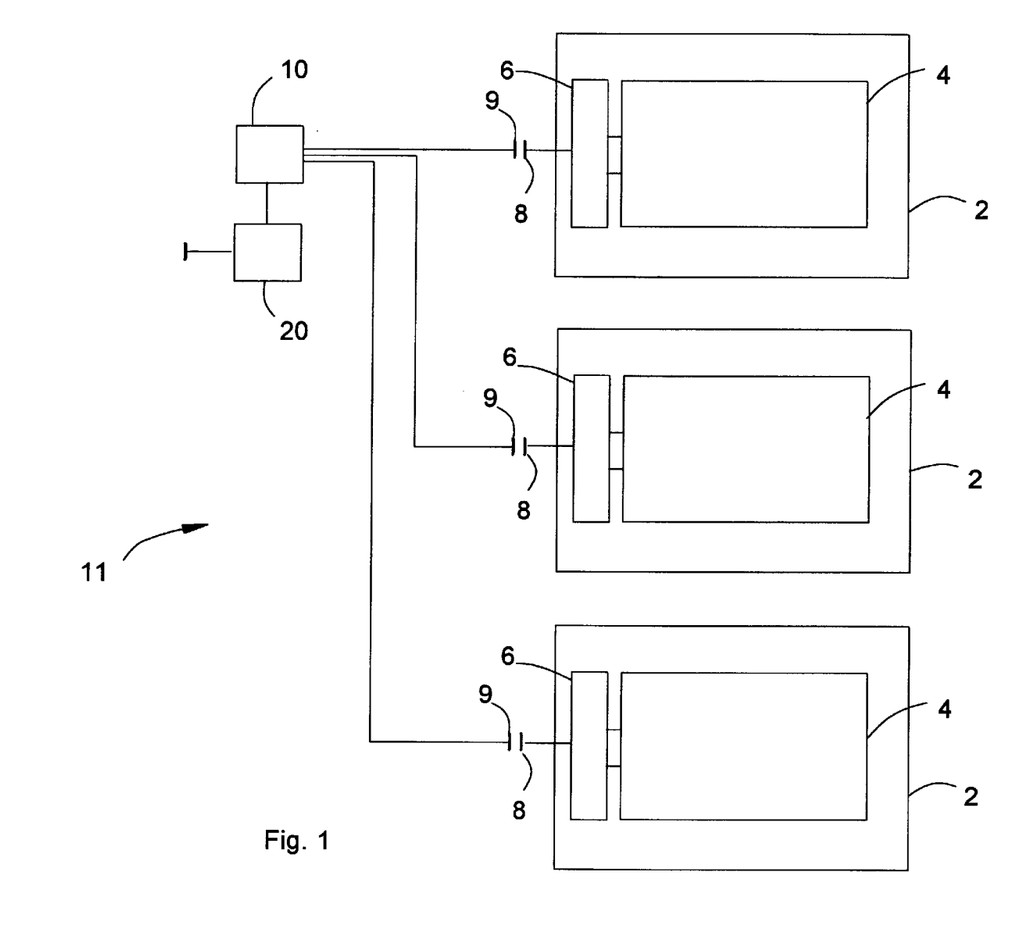
FIG. 1 is a schematic of the functional elements of one embodiment of the invention including multiple cell modules.

FIG. 1 is a schematic of the functional elements of one embodiment of the invention in which multiple electrochemical cell modules are combined to form a power supply. The power supply 11 includes three cell modules 2, each of which includes an electrochemical cell 4 and a disabling circuit 6 which is connected between the cell 4 and module contacts 8. When the module is free standing, the disabling circuit 6 maintains an open circuit, or the effective equivalent, between the cell 4 and at least one of the module contacts 8. The free-standing module 2 is thereby inert with respect to external bodies. In such a state, if a simple conductive body is placed, incidentally or by user intent, across the module contacts 8, no significant energy can be released from the cell 4 due to a short circuit. An essential element of the present invention is that the disabling circuit 6 must be connected to an external unlocking circuit of specific characteristics to form a combined circuit capable of releasing the cell energy. A master enabling circuit 10 includes the unlocking circuit. Until the unlocking circuit and the disabling circuit 6 are brought together, the cell energy is isolated—no energy can be accessed by an external device through the module contacts 8. When the disabling circuit 6 and unlocking circuit are connected, the cell electrical potential is automatically connected, without activation or switching from an externally powered switch or signal, to the module contacts 8. Because it is presumed that the cell modules are the sole energy source available to the power supply, all functions are powered solely by the cell module 2. The external unlocking circuit is otherwise without power to initiate communication with the disabling circuit 6. The structure and operation of the disabling circuit 6 and unlocking circuit are discussed in more detail below.

While the cell modules 2 are each separable from the power supply 11, the remaining power supply elements are preferable integrated into a single power supply frame. The frame in some embodiments is itself separable from a host device to be powered. Alternatively, the frame is permanently integrated into a host device. These alternatives will be discussed in more detail below. In FIG. 1, the power supply 11 master enabling circuit 10 includes three unlocking circuits connected to three sets of frame contacts 9 configured to mate with the module contacts 8. The enabling circuit 10 is capable of detecting when each unlocking circuit is connected to, and enabling, a respective module 2. When all modules 2 have been connected to an unlocking circuit, the enabling circuit 10 allows transmission of the cell energy to the associated host device. In this example, three modules are combined. However, it should be clear that any number of cell modules can be similarly connected with an appropriately configured frame and enabling circuit.

Although the above components are sufficient to enable delivery of cell energy to a host device as described, other functional elements may be included in this embodiment within a control circuit 20. These include, but are not limited to, protective elements, charging circuits and cell monitoring circuits. Because the individual modules 2 are otherwise rendered inert, a single set of protective devices for all of the cell modules 2 can be provided in the power supply frame. These include, but are not limited to, current, voltage and temperature monitoring controls. Similarly, cell charging and discharging control circuits and cell monitoring circuits may be included. With some cell types it may not be possible to move all protective elements out of the cell module. For example, to monitor module temperatures, a thermocouple is often placed proximate the cell and such would be ineffective in any other location. However, benefit is gained from those elements that may be moved from the cell modules and provided one time only in the power supply. The cell monitoring circuits may collect cell data such as for cell identification, operational time and charge level, and process it for cell control and for transmission by the control circuit to the host device for monitoring. The design and operation of the protective devices, charging and monitoring follows conventional design for these elements. There are many methods of implementing the elements described above known to those skilled in designing battery packs, and particular designs need not be detailed here. The separation here of functions between an enabling circuit and a control circuit is arbitrary and for the purpose of discussion of the underlying functions. In a preferred embodiment, all of the functions described are provided in one integrated electronic device and there may be no clear delineation between the components of the enabling and control circuits in a physical device.

Figure 2A:
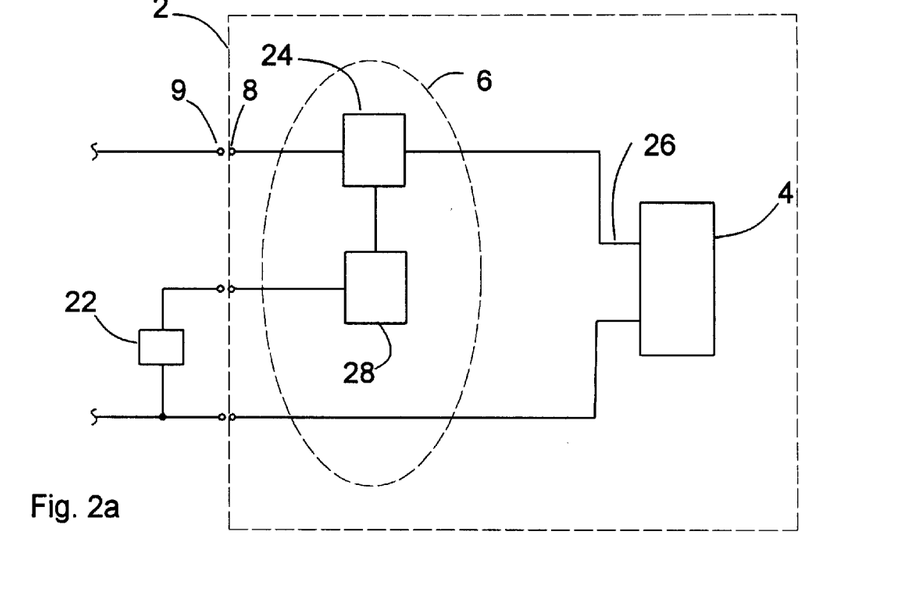
FIGS. 2a–2d depict schematic examples of disabling circuits and unlocking circuits matched to control cell output according to the present invention.
Figure 2B:
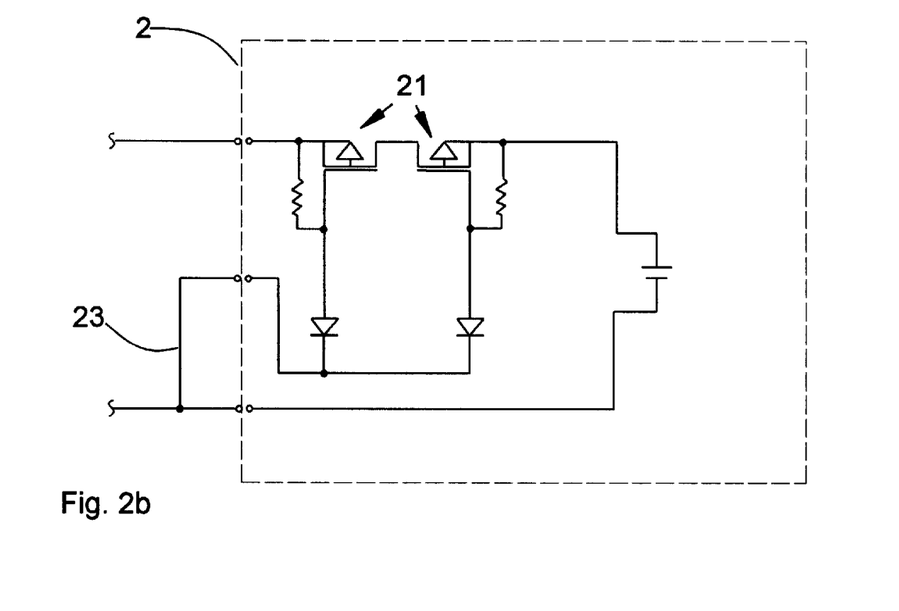
Figure 2C:
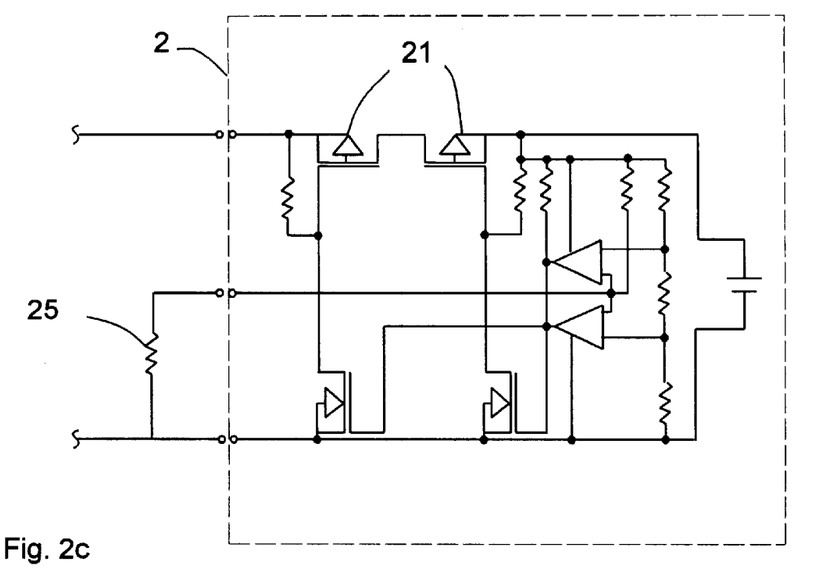
Figure 2D:
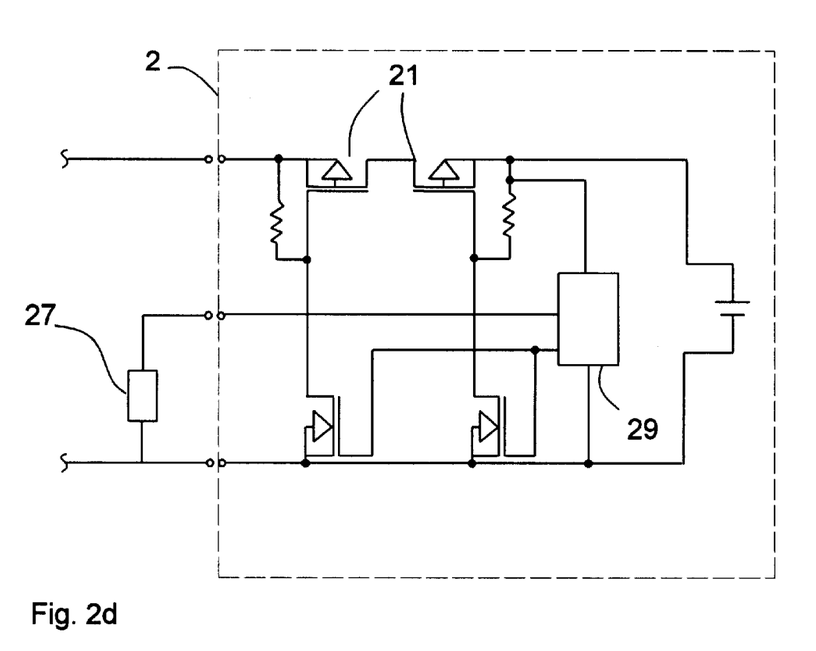

FIGS. 2a–2d depict schematic examples of disabling circuits and unlocking circuits matched to control cell output according to the present invention. In FIG. 2a a disabling circuit 6 includes a switch 24 and a switch control 28 shown in functional block form. The switch 24 is connected to a cell terminal 26. The switch 24 is open, isolating the cell 4 from the module contacts 8, when the cell-module 2 is free-standing and unconnected to any external circuits. The switch control 28 is connected to the switch 24 but is disabled unless also connected to an appropriate unlocking circuit 22. The switch 24, and switch control 28 are connected to module contacts 8 which allow them to be connected to the mating frame contacts 9. In FIG. 2b the switch includes two Metal Oxide Field Effect Transistors (MOSFET) 21. In this example, the unlocking circuit is essentially a jumper 23 which, when connected to the disabling circuit, draws down the MOSFET gate voltage. The switch is thereby closed and the cell potential is available to the module contacts. However, such a design does not provide sufficient assurance against unintended release of cell energy. FIG. 2c depicts a more preferred embodiment in which a circuit commonly known as a window comparator is used to match a resistor divider network with a specified impedance in an unlocking circuit. When an unlocking circuit resistor 25 within a specified resistance range is connected to the disabling circuit, gate voltage of a pair of MOSFETs is drawn down as above and the switch closed. In a similar but alternative configuration, the disabling circuit includes an incomplete tuned oscillator circuit. The unlocking circuit consists of elements having a complex impedance. When the unlocking circuit is connected to complete the oscillator circuit a response is produced to effect switching. In a more preferred embodiment shown in FIG. 2d, the unlocking circuit includes an integrated circuit identification device 27 such as a 64-bit serial ID chip. The disabling circuit includes a query device 29 which is an integrated circuit which periodically queries the input line for identification. When the identification device 27 is connected to the disabling circuit and returns the proper serial ID, the query device 29, enables a MOSFET switch as above. The details of these circuits and their specific constructions will be known to those skilled in the art.

Depending upon the nature of the desired communication between the switch control 28 and the control circuit 20, additional conductors and contacts than are shown in FIGS. 2a–d may be necessary. At least two of the conductors and associated contacts are used to transfer the cell energy between the cell and a host. "Release" of cell energy here means transmission of, or the ability to transmit, significant cell energy through the contacts. The examples of FIG. 2a–d provide protection as well against inadvertent charging. Only upon closing of the cell module switch is the cell susceptible to significant charging current in the examples shown. When the MOSFET switches shown are open, minor charging current may be induced but the cell damage that can potentially result from inappropriate charging will be prevented in most cases. Other, less preferable, disabling circuit designs are possible that do not protect against inappropriate charging. When initially connected to an unlocking circuit, a small amount of energy may be transmitted from the cell, and through the unlocking circuit, during the switching functions. If connection to an external circuit or body does not result in switching and enabling the cell module, small amounts of energy may still be transmitted from the cell. However, these switching and attempted switching events are not considered, by themselves, to be "release" of cell energy. In the above examples, the unlocking circuit has no independent power source.

Figure 3:
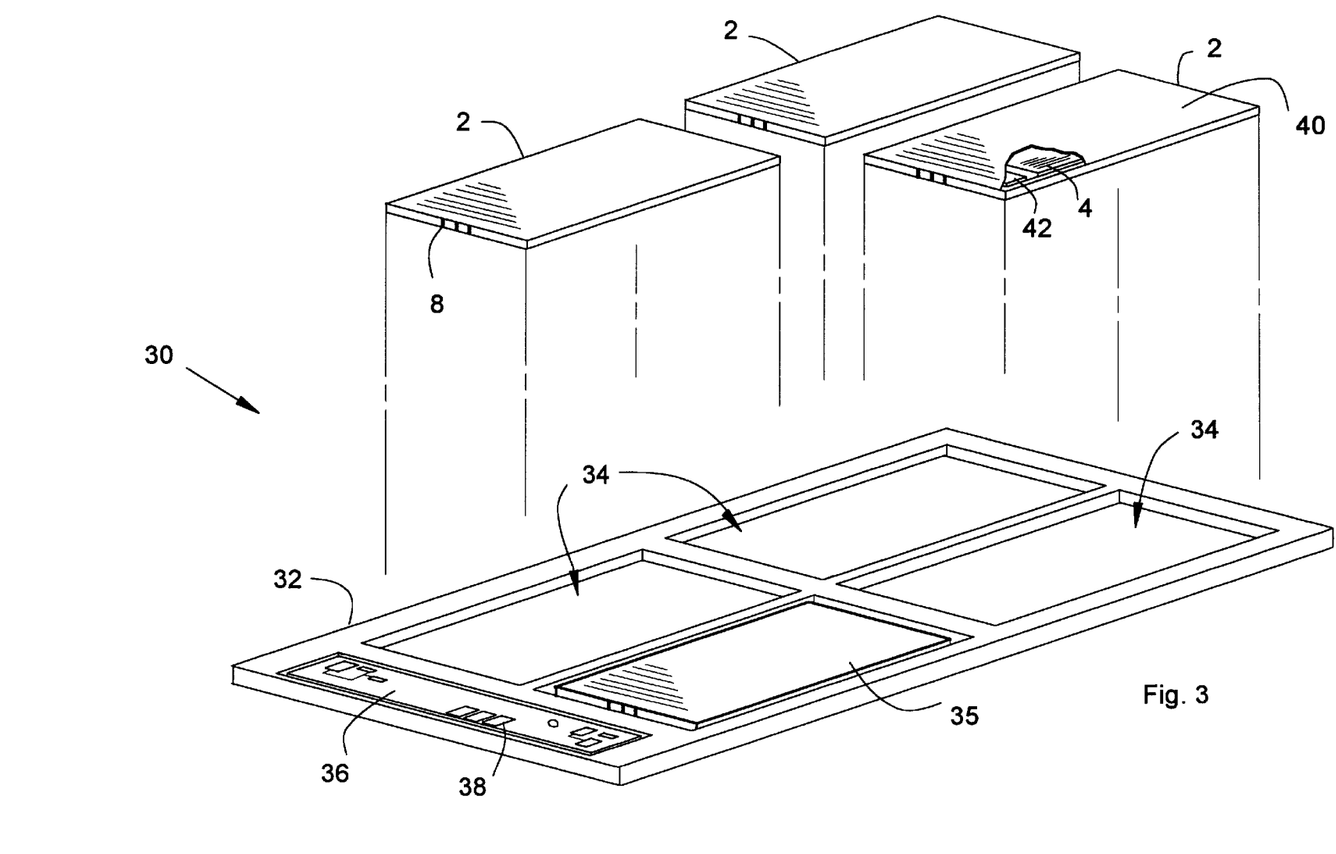
FIG. 3 is a isometric view of a battery pack including multiple separable cell modules in a tray according to one embodiment of the present invention.

Large thin planar battery packs and power supplies may be beneficially constructed using the present concepts. FIG. 3 depicts one implementation of a multi-cell battery pack according to the present invention. The battery pack 30 consists of a frame in the form of a planar tray 32 having four open-sided pockets 34. Three cell modules 2 are shown withdrawn from the tray 32. One connected cell module 35 has been inserted into a tray pocket 34. Each pocket 34 includes a means of temporarily retaining the modules 2 in the pocket. This may consist of one or more friction detents or any of a variety of mechanisms typically used for the purpose. The modules 2 each have contacts 8 for electrically connecting the module 2 to the tray 32. Each tray 32 includes mating tray contacts (not shown) which are connected through conductors to a frame printed circuit board 36 (PCB) received in a tray cavity. The connecting conductors may be buried in the tray 32 or attached to a surface. The frame PCB 36 includes the enabling circuit and control circuit elements as discussed previously. The frame PCB 36 also includes tray contacts 38 to allow the tray to be connected to a host device. In this way, the entire battery pack 30, or individual cell modules 2, may be replaced to provide power to a host device. The modules 2 are shown as a thin rigid housing 40 enclosing a cell 4 and module PCB 42 containing the disabling circuit. Various constructions of housings are known for this purpose, including thin-wall plastic and metal housings. The modules preferably have a thickness of less than six (6) millimeters as is possible with some electrochemical cell types. Various types of primary and secondary electrochemical cells, as are known in the art, are contemplated for use in the modules of the present invention. Examples of suitable cell types include, but are not limited to, lithium ion cells, including lithium ion polymer, lithium-sulfur cells, nickel metal hydride and lithium iron disulfide cells, which are adaptable to thin cell modules. In one embodiment, the cell is most preferably a lithium ion polymer cell. The term "lithium-sulfur", as used herein, pertains to a secondary or primary cell operating at ambient temperature and in which the anode comprises lithum metal and the cathode comprises an active material comprising an "electroactive sulfur-containing material," wherein the electroactive sulfur-containing material comprises the element sulfur in any form, wherein the electrochemical activity involves the breaking or forming of sulfur-sulfur covalent bonds. Examples of electroactive sulfur-containing materials include, but are not limited to, elemental sulfur and sulfur containing polymers, as for example described in PCT/US98/26160 to Geronov et al. A lithium iron disulfide cell is an example of a primary cell type that is adaptable to thin cell modules. References herein to charging events are intended to be applicable to secondary cells.

A module 2, as shown in FIG. 3, may be constructed to have sufficient rigidity and strength to survive typical user handling, despite extreme thinness, due to its planar dimensions being one fourth that of the overall tray. Enclosed thin cells having an aspect ratio greater than about 50:1 (maximum edge-to-edge planar dimension to thickness) become significantly susceptible to damage from external forces experienced in normal use and handling. It is thus desirable to maintain cell module dimensions below the 50:1 ratio. For example, a cell module based on a lithium ion polymer cell may have an overall thickness of about 4 millimeters and overall planar dimensions of about 70 and 140 millimeters. This small thickness is possible using sheet metal sidewalls on the module. Such a module has a capacity of 2.7 ampere-hours at an output voltage of 3.7 volts which may be reasonably combined into a multicell power supply for laptop computers. With these dimensions, the module aspect ratio is 35:1, sufficiently low for a relatively sturdy module. If three of these modules are combined into a power supply, the aspect ratio for the equivalent single cell power supply would be approximately 52.5:1, which is a configuration susceptible to damage in handling. Larger battery packs, using additional modules, would have larger yet equivalent aspect ratios. However, when multiple small modules are combined in the manner described here, a high aspect ratio flat power supply or battery pack may be constructed, but in a form which is durable. Particularly, power supplies and battery packs having aspect ratios greater than 50:1 may be constructed. However, large modules are more spatially efficient, less relative volume being used for inactive elements. Therefore, thin cell modules of the present invention preferably have an aspect ratio (maximum edge-to-edge planar dimension) to thickness of at least about 15:1 in the present invention.

The tray 32 may be formed in a variety of ways from inexpensive materials. Among others, a molded high density polymer tray is contemplated. Other tray designs having various pocket designs are also contemplated. In one alternative, tray slots are provided into which the cell modules are slid end first in the same manner in which the devices known in the art as PCMCIAs are currently employed in laptop computers. The cell module's contacts make connection with tray contacts at the inside end of the slot. Other alternatives for tray constructions are also contemplated.

Figure 4:
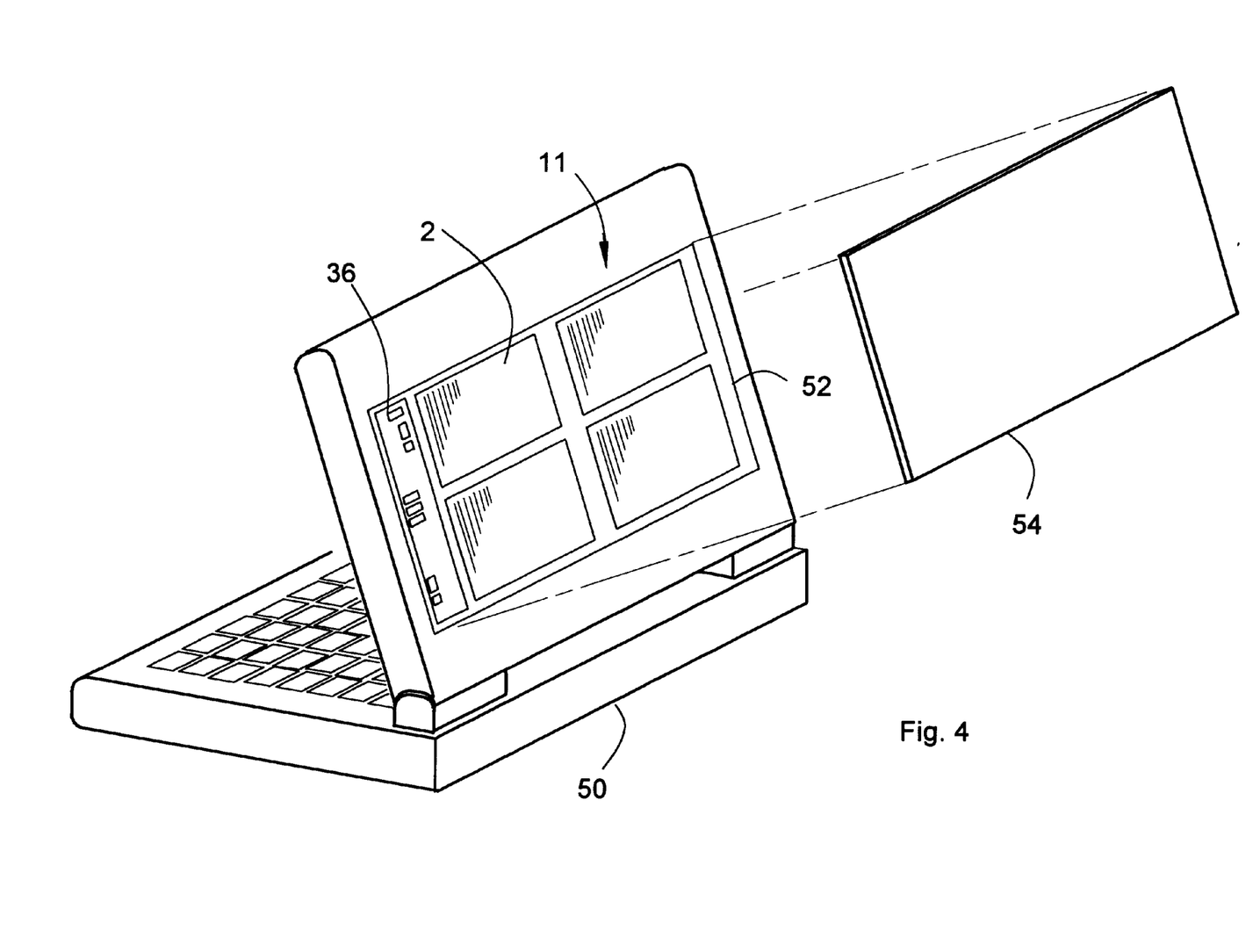
FIG. 4 is a isometric view of a host device having an integrated frame with multiple modules.

FIG. 4 depicts how individual modules 2 may be integrated into a host device 50 to form a power supply 11. In this configuration the frame is an integral part of the host device—placed in the thin cavity 52 behind a laptop computer monitor screen (not shown). Modules 2 having the same thin profile as those discussed in reference to FIG. 3 are received in pockets in the host device 50. A cover 54 secures the modules 2 in place. A frame PCB 36 provides the accompanying electronics as described above (the PCB and modules are shown in outline only). Alternatively, some or all of the unlocking circuits, protective elements, charging circuits and monitoring circuits may be integrated into the laptop's other electronic assemblies. In this example, the host 50 is a laptop computer where functions built onto the frame PCB 36 may alternatively be included on a computer motherboard. In the same manner as described above, disabling circuits in each module 2 render the modules inert when free-standing and separated from the laptop computer. The modules 2 may be replaced either singly or as a group. Upon removal of one module 2, the laptop host 50 is unpowered and inoperable. If a module 2 having a disabling circuit which does not match the unlocking circuits in the power supply is connected to the power supply, no power can be delivered and the system is still inoperable. Only when a module 2 having matching predetermined characteristics is connected will its power be delivered and the remaining modules power also be delivered to the host 50. Because it is presumed that the host 50 has no other power supply, the identification, unlocking, and enabling of the modules 2 is driven by the module's own power. In yet other embodiments, series and parallel combinations of modules are used wherein a subset of modules are first enabled to provide initial power and the remaining parallel modules may be added subsequently to provide additional capacity.

The preceding discussion is provided for example only. Other variations of the claimed inventive concepts will be obvious to those skilled in the art. Adaptation or incorporation of known alternative devices and materials, present and future is also contemplated. The intended scope of the invention is defined by the following claims.

We claim:

1. A portable power supply comprising:
   a predetermined number of cell modules, each module comprising:
      at least one electrochemical cell;
      a disabling circuit connected to the cell and preventing release of cell energy in a first condition;
      an enabling circuit having an interface capable of connecting the enabling circuit to all module disabling circuits, the enabling circuit releasing cell energy from each module during a second condition defined as when all modules are connected to the enabling circuit and the enabling circuit is receiving energy only from the modules; and
      a control circuit coupled to the enabling circuit and delivering cell energy to a host device interface during the second condition.

2. A portable power supply according to claim 1, further comprising:
   a power supply frame, the frame having a plurality of receptacles for receiving modules; the enabling circuit and control circuit disposed at least partially on the frame; and
   each module further comprising a rigid housing, the module disabling circuit and cell disposed within the housing.

3. A portable power supply according to claim 2, wherein:
   the frame is a separable thin planar tray having a tray aspect ratio and wherein the receptacles are aligned in a single plane; and
   the modules each have an aspect ratio which is less than the tray aspect ratio.

4. A portable power supply according to claim 3, wherein:
   each module aspect ratio is less than 50:1.

5. A portable power supply according to claim 4, wherein:
   each module aspect ratio is greater than 15:1.

6. A portable power supply according to claim 1, wherein:
   the enabling circuit comprises a predetermined number of unlocking circuits, each unlocking circuit connected to a single module in the second condition.

7. A portable power supply according to claim 1, wherein:
   each cell is rechargeable.

8. A portable power supply according to claim 7, wherein:
   each cell comprises a lithium ion polymer cell.

9. A portable power supply according to claim 7, wherein:
   each cell comprises a lithium-sulfur cell.

10. A portable power supply according to claim 2, wherein:
    the frame is configured to be integrated into a host device.

11. A portable power supply according to claim 1, wherein:
    each cell is isolated from charging current by the disabling circuit during the first condition.

12. A portable power supply according to claim 1, wherein:
    each cell has at least two terminals;
    each disabling circuit comprises a switch, the switch isolating one respective cell terminal in the first condition; and
    the enabling circuit causing the switch to close in the second condition.

13. A portable power supply according to claim 12, wherein:
    the switch comprises at least one metal oxide field effect transistor device.

14. A portable power supply according to claim 1, wherein:
    each cell module is without internal elements for protecting the cell against internal electrical shorting in the first condition.

15. A portable power supply comprising:
    a predetermined number of electrochemical cell modules; each module comprising: at least one electrochemical cell, each cell having terminals, means of electrically isolating at least one cell terminal in a first condition;
    a frame having a transmission means for transmitting cell energy to a host device, the transmission means having means of releasably connecting the cell modules and having means of enabling release of stored energy from the cells using the power within the cells during a second condition defined when all the cell modules are connected.

16. A portable power supply according to claim 15, wherein:

the cell is rechargeable.

17. A portable power supply comprising:

at least two cell modules, each module comprising:
rigid module housing,
at least one thin flat electrochemical cell disposed within the housing;

a thin tray having the same number of receptacles as the number of modules, each receptacle configured for receiving a module, the tray having a tray aspect ratio greater than 50 to 1, and having an enabling circuit for accessing cell energy and transmitting cell energy to a host device.

18. A portable power supply according to claim 17, wherein:

each module has an aspect ratio less than 50 to 1.

19. A portable power supply according to claim 17, wherein:

each cell module is without internal elements for protecting the cell against internal electrical shorting in the first condition.

20. A portable power supply according to claim 17, wherein:

the cell is rechargeable.

21. A portable power supply according to claim 20, wherein:

each cell comprises a lithium ion polymer cell.

22. A portable power supply according to claim 21, wherein:

each cell comprises a lithium-sulfur cell.

* * * * *